United States Patent
Kim et al.

(10) Patent No.: US 9,454,149 B2
(45) Date of Patent: Sep. 27, 2016

(54) EXTRACTING ATTRIBUTE FAIL RATES FROM CONVOLUTED SYSTEMS

(71) Applicant: Synopsys Inc., Mountain View, CA (US)

(72) Inventors: John Kim, Santa Clara, CA (US); Brian Gordon, San Jose, CA (US); Christophe Suzor, Mimet (FR); Karen Movsisyan, Yerevan (AM)

(73) Assignee: Synopsys, Inc., Mountain View, CA (US)

( * ) Notice: Subject to any disclaimer, the term of this patent is extended or adjusted under 35 U.S.C. 154(b) by 676 days.

(21) Appl. No.: 13/872,130

(22) Filed: Apr. 28, 2013

(65) Prior Publication Data

US 2014/0324374 A1 Oct. 30, 2014

(51) Int. Cl.
*G01N 37/00* (2006.01)
*G05B 23/02* (2006.01)
*G05B 17/02* (2006.01)

(52) U.S. Cl.
CPC .......... *G05B 23/0254* (2013.01); *G05B 17/02* (2013.01); *Y02P 90/14* (2015.11); *Y02P 90/18* (2015.11); *Y02P 90/26* (2015.11); *Y02P 90/265* (2015.11)

(58) Field of Classification Search
CPC .......... H01L 2924/0002; H01L 22/20; G05B 19/41875; G05B 2219/32187; G05B 2219/32194; G05B 2219/45031; G03F 7/705
See application file for complete search history.

(56) References Cited

U.S. PATENT DOCUMENTS

| | | | |
|---|---|---|---|
| 7,494,893 B1 * | 2/2009 | Inani | G05B 19/41875 438/424 |
| 8,108,805 B2 * | 1/2012 | Rathsack | G03F 7/705 700/110 |
| 2008/0312875 A1 * | 12/2008 | Yu | G05B 19/41875 702/182 |

* cited by examiner

*Primary Examiner* — Elias Desta
(74) *Attorney, Agent, or Firm* — Paul S. Drake; Craig Shinners

(57) ABSTRACT

A method, system or computer usable program product for extracting attribute fail rates for manufactured devices including testing manufactured devices having a set of attributes to provide a set of test results stored in memory; generating a yield model of the manufactured devices parsed by the set of attributes; populating the yield model based on the set of test results; and utilizing a processor to perform statistical analysis of the populated yield model to extract fail rates of the selected subset of attributes.

34 Claims, 7 Drawing Sheets

FIG. 3

$$\begin{bmatrix} n_{a1} & n_{b1} & n_{c1} & \cdots & n_{k1} \\ n_{a2} & n_{b2} & n_{c2} & \cdots & n_{k2} \\ n_{a3} & n_{b3} & n_{c3} & \cdots & n_{k3} \\ & & \vdots & & \\ n_{am} & n_{bm} & n_{cm} & \cdots & n_{km} \end{bmatrix} \begin{bmatrix} \lambda_a \\ \lambda_b \\ \lambda_c \\ \vdots \\ \lambda_k \end{bmatrix} = \begin{bmatrix} -\ln(y_1) \\ -\ln(y_2) \\ -\ln(y_3) \\ \vdots \\ -\ln(y_m) \end{bmatrix}$$

FIG. 4A

Net Type 1 (N1)   M1 → V1X1 → M2 → V2X1 → M3
($Y_{N1}$ = .99401)   → V2X1(2) → M2 → V1X2 → M1

Net Type 2 (N2)   M1 → V1X2 → M2 → V2X1 → M3
($Y_{N2}$ = .99815)   → V2X1 → M2 → V1X2(2) → M1

Net Type 3 (N3)   M1 → V1X1 → M2 → V2X1 → M3
($Y_{N3}$ = .97046)   → V2X1 → M2 → V1X2 → M1

Net Type 4 (N4)   M1 → V1X2 → M2 → V2X2 → M3
($Y_{N4}$ = .97012)   → V2X1(3) → M2 → V1X2 → M1

Net Type 5 (N5)   M1 → V1X1(2) → M2 → V2X1(2) → M3
($Y_{N5}$ = .97426)   → V2X1(2) → M2 → V1X1(2) → M1

Net Type 6 (N6)   M1 → V1X2 → M2 → V1X2 → M1
($Y_{N6}$ = .98635)

FIG. 4B

|    | V1X1 | V1X2 | V2X1 | V2X2 | Failure Rate ($\lambda_j$) |   | Yield ($Y_{Ni}$) |
|----|------|------|------|------|---------------------------|---|------------------|
| N1 | 1    | 1    | 3    | 0    | $\lambda_1$               |   | .99401           |
| N2 | 0    | 3    | 2    | 0    | $\lambda_2$               | = | .99815           |
| N3 | 1    | 1    | 2    | 0    | $\lambda_3$               |   | .97046           |
| N4 | 0    | 2    | 3    | 1    | $\lambda_4$               |   | .97012           |
| N5 | 4    | 0    | 4    | 0    |                           |   | .97426           |
| N6 | 0    | 2    | 0    | 0    |                           |   | .98635           |

| | | | |
|---|---|---|---|
| N1: | $\lambda_1 + \lambda_2 + 3\lambda_3$ | = | .99401 |
| N2: | $3\lambda_2 + 2\lambda_3$ | = | .99815 |
| N3: | $\lambda_1 + \lambda_2 + 2\lambda_3$ | = | .97046 |
| N4: | $2\lambda_2 + 3\lambda_3 + \lambda_4$ | = | .97012 |
| N5: | $4\lambda_1 + \phantom{xx} 4\lambda_3$ | = | .97426 |
| N6: | $2\lambda_2$ | = | .98635 |

FIG. 6

$$\begin{array}{c} \\ N1 \\ N2 \\ N3 \\ N4 \\ N5 \\ N6 \\ \cdot \\ \cdot \\ \cdot \\ \cdot \\ N32 \end{array} \begin{array}{c} \begin{matrix} M1 & M2 & M3 & M4 & M5 \end{matrix} \\ \begin{bmatrix} 701 & 613 & 456 & 513 & 692 \\ 693 & 676 & 606 & 496 & 706 \\ 586 & 514 & 713 & 562 & 586 \\ 721 & 654 & 492 & 661 & 703 \\ 680 & 703 & 510 & 586 & 613 \\ 562 & 591 & 632 & 702 & 676 \\ \cdot & \cdot & \cdot & \cdot & \cdot \\ \cdot & \cdot & \cdot & \cdot & \cdot \\ \cdot & \cdot & \cdot & \cdot & \cdot \\ \cdot & \cdot & \cdot & \cdot & \cdot \\ 632 & 576 & 602 & 576 & 651 \end{bmatrix} \end{array} \begin{array}{c} D_i \\ \begin{bmatrix} D_1 \\ D_2 \\ D_3 \\ D_4 \\ D_5 \end{bmatrix} \end{array} = \begin{array}{c} Y_{Ni} \\ \begin{bmatrix} .9986 \\ .9903 \\ .9615 \\ .9743 \\ .9932 \\ .9846 \\ \cdot \\ \cdot \\ \cdot \\ \cdot \\ .9832 \end{bmatrix} \end{array} \begin{array}{c} P_{Ni} \\ \begin{bmatrix} 101 \\ 10 \\ 96 \\ 400 \\ 35 \\ 92 \\ \cdot \\ \cdot \\ \cdot \\ \cdot \\ 136 \end{bmatrix} \end{array}$$

EXTRACTING ATTRIBUTE FAIL RATES FROM CONVOLUTED SYSTEMS

BACKGROUND

1. Technical Field

The present invention relates generally to extracting attribute fail rates from convoluted systems and in particular, to a computer implemented method for extracting attribute fail rates from convoluted process and design systems using yield modeling and statistical analysis.

2. Description of Related Art

Yield modeling is a process for modeling manufactured semiconductor devices to determine a ratio of devices that pass electrical testing to the total number of devices being tested. This is usually expressed as a percentage of good parts from the whole tested (e.g. 97%). Semiconductor manufacturers will attempt to maximize test yields in order to reduce the number of units rejected, thereby increasing revenue and profitability. Given that electrical testing is at or near the end of a long and expensive manufacturing process, any small improvement in yield can have a large impact on the bottom line.

There are many types of yield models including the Poisson model, the Murphy model, and the Exponential model. The model chosen is usually based on actual test data experienced by the manufacturer. That is, actual data may be gathered and compared to various models to determine the best fit for improved yield predictions.

The Poisson yield model assumes a uniform distribution of randomly occurring defects. That is, if a wafer has N chips and a large number n of randomly occurring defects for a yield of n/N=m, then the probability P that a given chip contains k defects may be approximated by the Poisson distribution as $P=e^{-m}(m^k/k!)$. This results in yield Y being the probability that a chip has no defects or k=0, so $Y=e^{-m}$. If D is the chip defect density, then D=mA where A is the area of each chip and AD is the average number of defects per chip. As a result, the Poisson yield model is $Y=e^{(-AD)}$. The Murphy yield model assumes a triangular distribution of defects resulting in a yield equation of $Y=[(1-e^{(-AD)})/(AD)]^2$. The Exponential yield model assumes higher defect densities clustered in some regions of a wafer resulting in a yield equation $Y=e^{sqrt(AD)}$. Other yield models may utilize different assumptions of the behavior of defects, alternative defect distributions, and different formulas for modeling yield.

Failure analysis is a process of collecting and analyzing data to determine the cause of a failure. In semiconductor manufacturing, it is the process of determining how or why a semiconductor device has failed. Semiconductor manufacturing processes involve complex physical and chemical interactions. As semiconductor manufacturing becomes more complex, it is becoming more difficult to identify and determine the cause of a failure. A variety of failure analysis techniques may be utilized including non-destructive and destructive techniques. Non-destructive techniques include optical microscopy, curve tracing and x-ray radiography. Destructive techniques include decapsulation, sectioning and focused ion beam imaging. The results of such non-destructive and destructive techniques can then be analyzed to determine a cause of the failure.

SUMMARY

The illustrative embodiments provide a method, system, and computer usable program product for extracting attribute fail rates for manufactured devices including testing manufactured devices having a set of attributes to provide a set of test results stored in memory; generating a yield model of the manufactured devices parsed by the set of attributes; populating the yield model based on the set of test results; and utilizing a processor to perform statistical analysis of the populated yield model to extract fail rates of the selected subset of attributes.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 3 is an attribute based yield matrix equation utilizing a Poisson yield model suitable for identifying fail rates in which various embodiments may be implemented;

FIGS. 4A through 4D illustrate a set of net types or systems modeled and analyzed utilizing the attribute based yield matrix equation in accordance with a first embodiment;

FIG. 6 illustrates a set of net types or systems modeled and analyzed utilizing the attribute based yield matrix equation in accordance with a second embodiment.

DETAILED DESCRIPTION

Processes and devices may be implemented and utilized to extract attribute fail rates from convoluted systems. These processes and apparatuses may be implemented and utilized as will be explained with reference to the various embodiments below.

Figure 1:
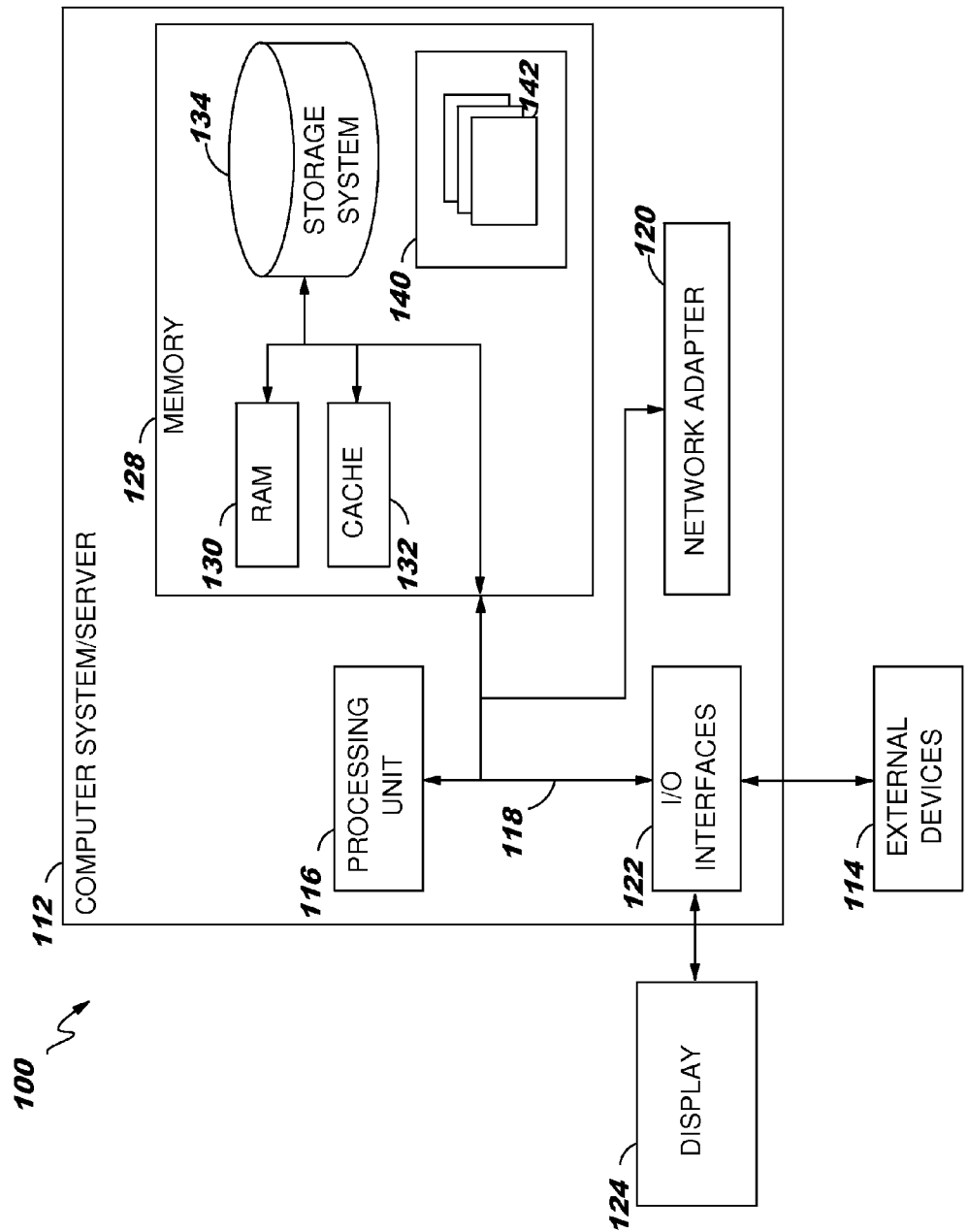
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of embodiments described herein. Regardless, data processing system 100 is capable of being implemented and/or performing any of the functionality set forth herein such as extracting attribute fail rates from convoluted systems.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of various embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the various embodiments. For example, a program module may be software for extracting process fail rates from convoluted systems.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

A netlist can be stored in memory and utilized to describe the connectivity of an electronic design. A netlist is composed of a set of parts or devices referred to as instances, each instance having one or more connection points referred to as pins or ports, with wires or signal lines referred to as nets interconnecting the pins. A netlist can be utilized to describe a computer system such as described above, a semiconductor chip, a functional portion of a chip such as a floating point unit, and smaller portions such as the interconnections between various transistors on a small portion of a semiconductor chip.

Figure 2:
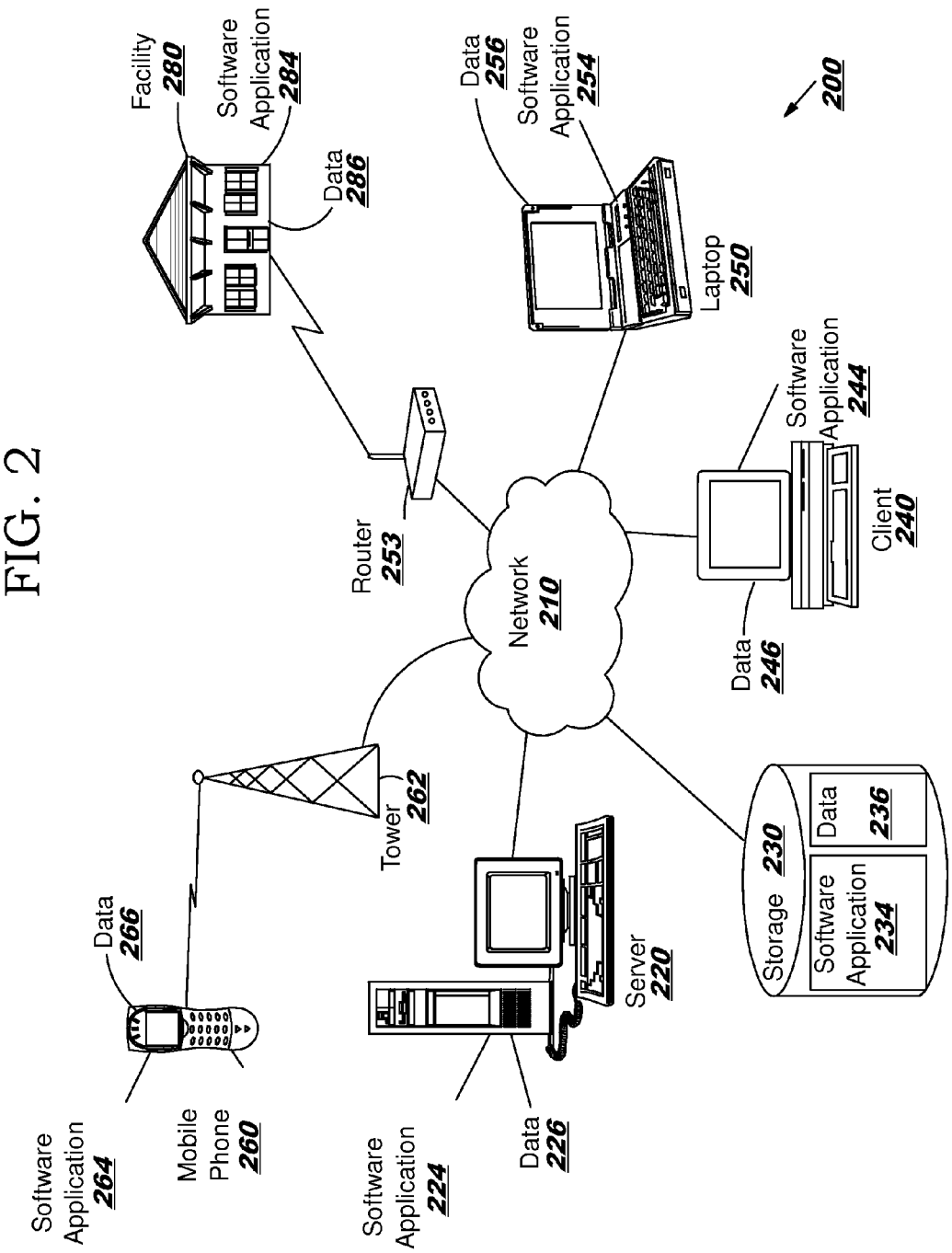
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1 which may be utilized for extracting attribute fail rates from convoluted systems. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for extracting process fail rates from convoluted systems or other software applications and data in accordance with embodiments described herein. Storage 230 may contain software application 234 and a content source such as data 236 for extracting process fail rates from convoluted systems. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application that can extract process fail rates from convoluted systems.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

FIG. 3 is an attribute based yield matrix equation utilizing a Poisson yield model suitable for identifying fail rates in which various embodiments may be implemented. The derivation of the yield matrix equation will first be explained below, followed by an example of the application of the matrix equation to semiconductor manufacturing processes and products. Further below will be an explanation of the analysis of the matrix equation using various statistical methods. Although the yield matrix equation is shown utilizing a Poisson yield model, other yield models may be similarly utilized.

Each row of the yield matrix equation of FIG. 3 is a yield equation representing a unique element of the system being modeled, each n represents an attribute or sub-element of the system being modeled, y represents the total yield of that unique element, and λ represents the fail rate for that unique element. As an example described in greater detail below, each row may represent a unique interconnect or net (with m unique nets) of a product or test chip, n may represent each type of via within that interconnect (up to k unique types of vias), y the yield of that interconnect net, and λ the fail rate of each type of via utilized among the interconnects. The fail rate λ is derived for each type of via from the matrix equation. For ease of explanation, the derivation of the matrix equation will be explained below with reference to this example.

The derivation of the Poisson based yield matrix equation starts from the Poisson equation $$Y = Y_0 e^{(-\lambda^* n)} = Y_0 \exp(-\lambda^* n)$$

where λ=fail rate of via type n, n=count of vias in the group of nets where the yield term is calculated, and $Y_0$=yield without this attribution/mechanism.

Generally total yield Y is given by the following:

$$Y = y_a * y_b * y_c * \ldots * y_k$$

where $y_i$ is equal to the yield for each via system (net or group of nets which contain those vias). Therefore:

$$Y = y_{a0} \exp(-\lambda_a^* n_a) * y_{b0} \exp(-\lambda_b^* n_b) * y_{c0} \exp(-\lambda_c^* n_c) * \ldots * y_{k0} \exp(-\lambda_k^* n_k)$$

$$Y = \exp(-\lambda_a^* n_a) * \exp(-\lambda_b^* n_b) * \exp(-\lambda_c^* n_c) * \ldots * \exp(-\lambda_k^* n_k) * (y_{a0} * y_{b0} * y_{c0} * \ldots y_{k0})$$

$$\ln(Y) = \ln[\exp(-\lambda_a^* n_a) * \ln[\exp(-\lambda_b^* n_b) * \ln[\exp(-\lambda_c^* n_c) * \ldots * \ln[\exp(-\lambda_k^* n_k) * (y_{a0} * y_{b0} * y_{c0} * \ldots y_{k0})]$$

$$\ln(Y) = \ln(\exp(-\lambda_a^* n_a)) + \ln(\exp(-\lambda_b^* n_b)) + \ln(\exp(-\lambda_c^* n_c)) + \ldots + \ln(\exp(-\lambda_k^* n_k)) + \ln(y_{a0} * y_{b0} * y_{c0} * \ldots y_{k0})$$

$$\ln(Y) = -\lambda_a^* n_a - \lambda_b^* n_b - \lambda_c^* n_c - \ldots - \lambda_k^* n_k + \ln(y_{a0} * y_{b0} * y_{c0} * \ldots y_{k0})$$

$$-\ln(Y) = \lambda_a^* n_a + \lambda_b^* n_b + \lambda_c^* n_c + \ldots + \lambda_k^* n_k - \ln(y_{a0} * y_{b0} * y_{c0} * \ldots y_{k0})$$

With some substitutions, let:

$$-\ln(Y) = Y; \ -\ln(y_{a0} * y_{b0} * y_{c0} * \ldots * y_{k0}) = \lambda_0$$

so $$Y = \lambda_0 + \lambda_a^* n_a + \lambda_b^* n_b + \lambda_a^* n_a + \ldots + \lambda_k^* n_k$$

which can be subdivided into multiple unique yield equations implemented as a matrix as shown in FIG. 3. Each row of FIG. 3 is a yield equation for a unique type of net within the product, test chip, or process being modeled. The variable k is equal to the number of different via types and the variable m is the number of different grouping of nets (number of linear systems).

FIGS. 4A through 4D illustrate a set of net types or systems modeled and analyzed utilizing the attribute based yield matrix equation in accordance with a first embodiment. In this example, a test chip may have three metal layers with 6 types of interconnections (m=6) or net types (N1 through N6) utilizing four types of vias (k=4). Each type of interconnection has a yield rate $Y_{Ni}$ determined from sampling and each via type has a failure rate $\lambda_j$. The metal layers are M1, M2 and M3. The via types are V1X1, V1X2, V2X1 and V2X2 where V1 is a via from M1 to M2 or vice versa and V2 is a via from M2 to M2 or vice versa, and where X1 and X2 are two different types of via designs. In addition, more than one via may be provided in parallel, which is shown as V1X1(2) indicating two X1 type vias in parallel from M1 to M2 or vice versa.

As shown in FIG. 4A, each net type is unique and may be assigned a unique identifier (e.g. N1 though N6) useful for managing the equations in a computer database for statistical analysis. Although net types 1 and 3 (N1 and N3) have similar structures with the same via types in the same sequence, they have different numbers of V2X1 (via type X1 connecting metal layer 2 and metal layer 3). Also net type 6 (N6) only proceeds from metal layer 1 to metal layer 2 and back, unlike the other net types.

Each unique net type is represented as a horizontal row in the yield matrix equation shown at FIG. 4B where the number of each type of via is enumerated in each column and the yield ($Y_{Ni}$) for each net type is shown. A zero may be provided where a via type is not included in a specific net type. The unknowns are the failure rates shown as $\lambda_i$. Of importance is that there are four unknown failure rates for the four via types and six net types, yielding four variables and six equations as shown below.

Figures 4C, 4D:
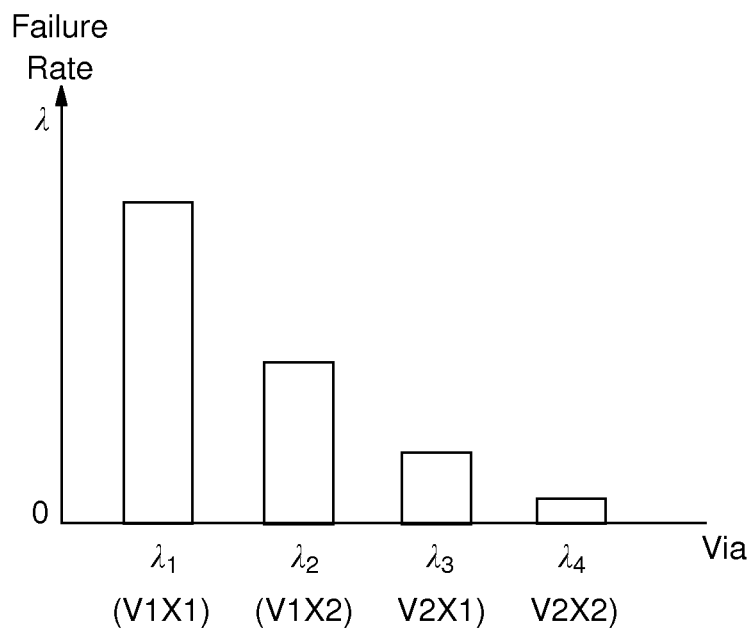

From this yield matrix equation, a set of equations can be generated utilizing matrix multiplication as shown in FIG. 4C. This results in six equations and four variables for the six net types with known yield and the four via types with unknown failure rates. With more equations than variables, this is an overdetermined system where multiple solutions can exist. As a result, statistical analysis such as regression analysis may be utilized to determine a best solution with least error or deviation from the solution. That is, the failure rate for each type of via can be determined using various types of statistical analysis where $\lambda_1$ is the failure rate for via type V1X1, $\lambda_2$ is the failure rate for via type V1X2, $\lambda_3$ is the failure rate for V2X1 and $\lambda_4$ is the failure rate for V2X2. For example, regression analysis may be utilized to determine a least squares fit of a solution to the data. Alternative types of statistical analysis may be utilized including utilizing a classification tree.

A possible result of such statistical analysis is shown in FIG. 4D where an expected failure rate for each via type is generated using statistical analysis such as regression analysis. In this example, more failure is expected with via V1X1 than the other vias, with V1X2 having the second highest failure rate. Given that most of the failure rate is in metal 1 to metal 2 vias (V1X_) rather than metal 2 to metal 3 vias (V2X_), additional analysis could be focused on metal 1 to metal 2 interconnect manufacturing processes or design rules for sources of failures. Additional analysis could also be focused on via type X1 as it has a higher failure rate than via type X2 in all corresponding metal layers.

The underlying sample data could be further parsed to provide additional analysis to help more precisely determine the source of failures. This parsing could be focused on design attributes or manufacturing process attributes. For example, different equipment may be utilized for providing similar manufacturing processes, but one piece of equipment may be malfunctioning slightly. By separating the data by equipment utilized in manufacturing, additional analysis may determine if that could be a cause of failure.

Figure 5:
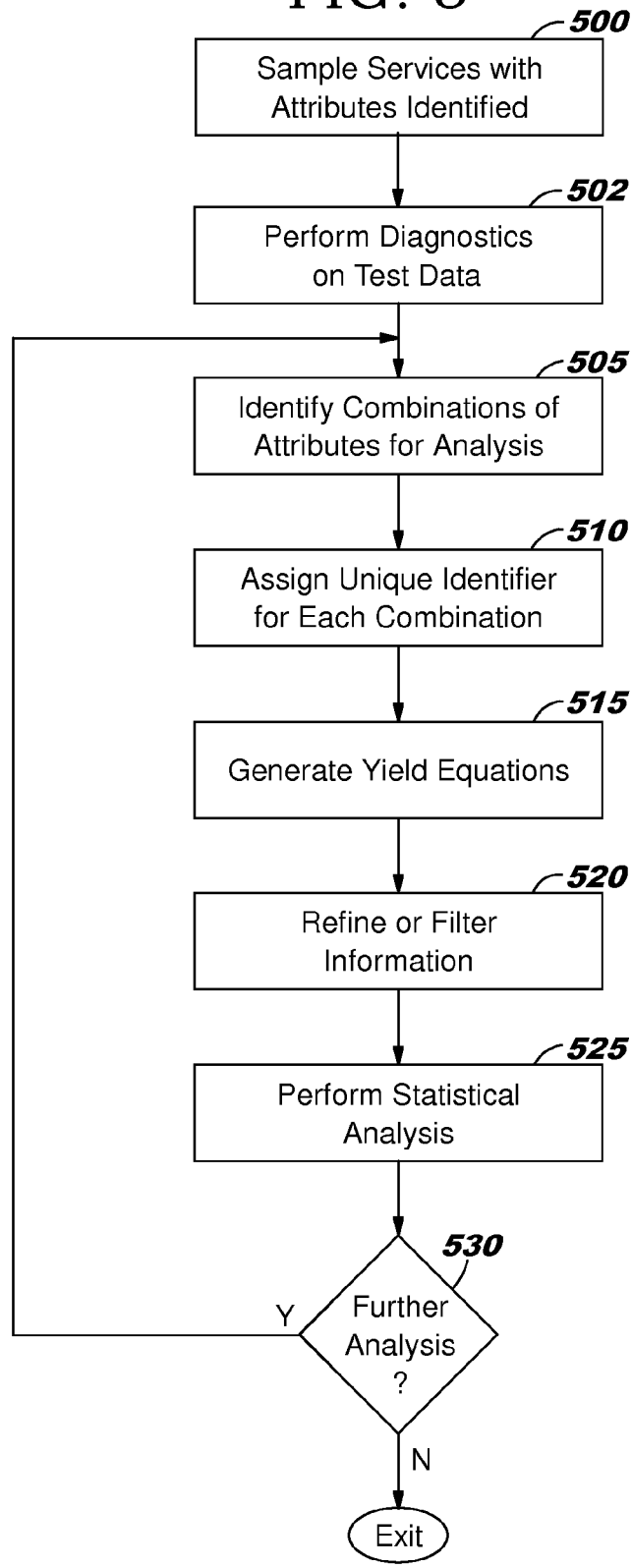
FIG. 5 is a flow diagram of extracting attribute fail rates from convoluted systems in accordance with a first embodiment.

FIG. 5 is a flow diagram of extracting attribute fail rates from convoluted systems in accordance with a first embodiment. In a first step 500, initial analysis of a convoluted system may be initiated. This can include sampling production or test devices to generate test data to determine which devices are yielding and which are failing. Various design and process attributes may be captured with yield and failure information for each device for use in the analysis described below. For example, ATPG (Automatic Test Pattern Generation) may be utilized in an electronic design automation technology to find a test sequence that enables automatic test equipment to identify faulty circuit behavior. This information may be correlated with a database of circuit design and manufacturing process information stored for each device being tested. In a second step 502, the test data may be analyzed using test diagnostic tools to generate test results identifying fault locations. That is, patterns in the test data can be utilized to identify fault locations useful for further analysis as described below. In a third step 505, various unique combinations of attributes are identified for analysis. For example, device vias may be analyzed by via type and metal layer as described above with reference to FIGS. 4A through 4D. Then in step 510, each unique combination of attributes is assigned a unique identifier for utilization as described below.

Subsequently in step 515, the unique identifiers are then utilized to generate equations using yield information captured for each combination of attributes. This provides a set of equations to score each unique combination of attributes in terms of yield effect. These equations may be developed utilizing a yield matrix equation or other similar methods. It is important that the system of equations be overspecified with more equations (number of unique combinations of attributes) than variables (number of attribute types with failure rates to determine) that would require statistical analysis of the equations. An equal number of equations and variables may be utilized, which results in a single solution without the need for statistical analysis but in a real world manufactured system, it is unlikely that this will be the case. If there are fewer equations than variables, then the attributes may be aggregated or otherwise parsed until there are more equations than variables. The form of aggregation and parsing may be developed based on what the user determines are combinations of attributes suitable for determining failure rates based on yields.

Then in step 520, the resulting yield based equations or the underlying yield information may be refined or otherwise filtered for improving subsequent statistical analysis. For example, certain outlier sample data may be due to improper sampling techniques and may be filtered to avoid skewing the underlying data. Another example is to utilize stepwise regression to refine the equations through forward selection, backward elimination or bidirectional elimination. Step 520 may be eliminated and the raw data and equations utilized in subsequent step 525.

In step 525, statistical analysis of the equations and yield information is utilized to determine failure rates by attribute. This analysis helps identify problem attributes for correction or further analysis. Regression analysis may be utilized as well as other statistical techniques such as utilizing a classification tree. Many such techniques are known to those of ordinary skill for analyzing the equations and underlying sample data. Then in step 530, the user can determine whether to perform additional analysis of various combinations of attributes. If so, then processing returns to step 505, otherwise processing exits.

Many types of attributes can be analyzed using the above described processes. This can include design attributes such a shape, configuration, design rules such as proximity limitations and critical dimensions, etc. of how a device or part of a device is designed. It can further include the effect of manufacturing processes on design attributes such as the effect of temperature and duration of annealing or deposition, implant energies and ratios of elements, photolithography exposure intensity and duration, etc. on various design attributes. Since design structures can include multiple types of elements (e.g. via types), each element including or affected by various attributes, the resulting system is convoluted. These attributes can be isolated and their fail rates analyzed using the techniques described herein. The results of the above described analysis may be provided to a diagnostic tool, an EDA (electronic design automation) diagnostic tool at an RTL level (register-transfer level), or an EDA diagnostic tool at a physical level for the purpose of reducing defects.

FIG. 6 illustrates a set of net types or systems modeled and analyzed utilizing the attribute based yield matrix equation in accordance with a second embodiment. In the example shown in this embodiment, there are products with five metal layers, each metal layer having a variety of net types, each net type having a critical area at each metal layer with a known yield. In this embodiment, net types can be divided by a variety of factors such as by structural type design for each metal layer. For example, there may be two structural types available for each of five layers, resulting in 32 different combinations (N1 through N32). What is desired in this example is to determine whether the size of the critical area affects the defect density by metal layer or by structural type.

As shown in FIG. 6, there are five columns (M1 through M5), one for each metal layer, and thirty two rows (N1 through N32), one row for each possible combination of structural type. Each entry for a given metal layer and structural type combination includes an average critical area (above or below a certain predetermined size) in microns squared. That is, the average critical area for a given metal layer for the sample population of that structural type (e.g. N1) is provided. As a result, there are more equations than variables which allows for statistical analysis of the results as described above. Yield information ($Y_{Ni}$) is provided for each row and defect density ($D_i$) is to be determined for each metal layer by critical area size.

Also shown is the number of samples available of each net type ($P_{Ni}$). Sample size is not part of this equation in this embodiment, but can be utilized to weight the statistical analysis. That is, if there are many net type N1s and very few N2s, then the N1s could have a greater weight when performing the statistical analysis such as regression analysis. Otherwise, those with smaller sample sizes may unduly weight any least squares regression or other statistical analysis.

Given the information provided and the analysis described herein, a defect density for each metal layer by critical area size can be determined, thereby indicting whether further analysis of certain metal layers or defect densities should be further examined, tested, or otherwise analyzed. Additional analysis could be performed utilizing the same underlying test data. For example, each structural type combination (e.g. N1) could be bifurcated into two or more sets of data where the first set (e.g. N1a) includes samples where the critical area is below a certain size and where the second set (e.g. N1b) includes samples above a certain predetermined size. This would allow the user to better isolate the effect of critical area on defect density.

Figure 7:
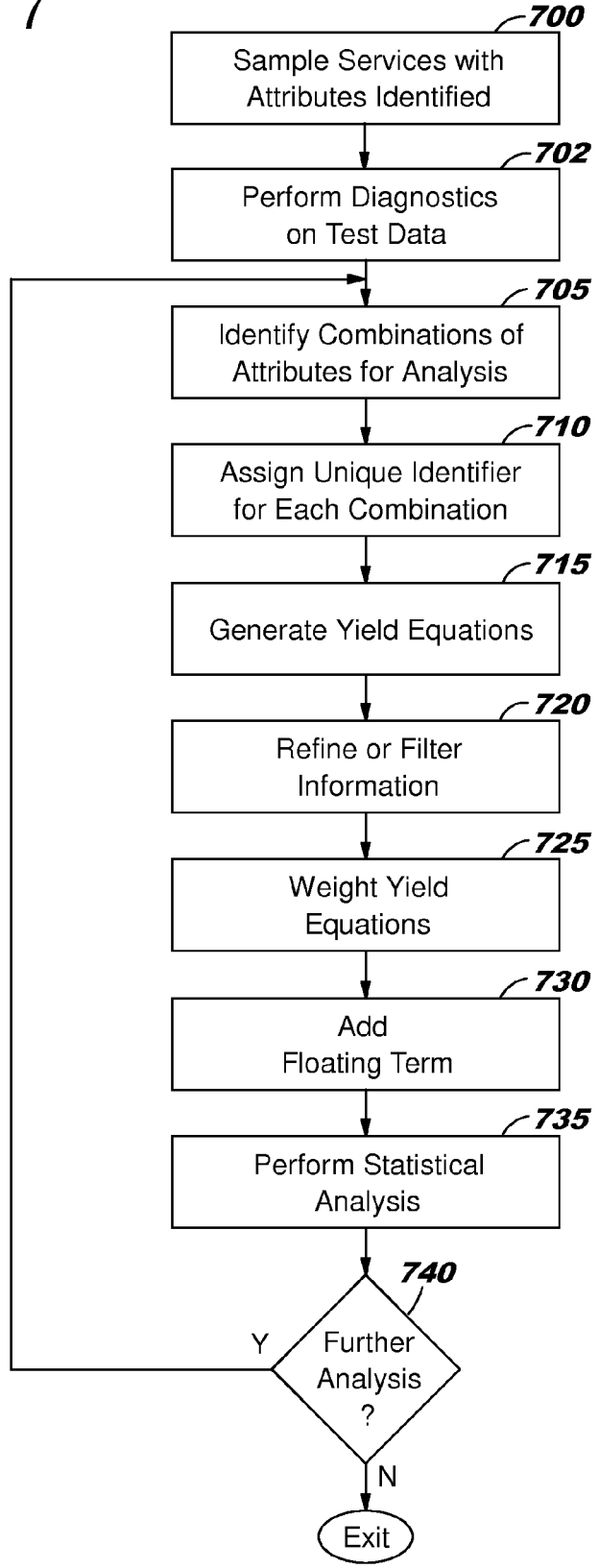
FIG. 7 is a flow diagram of extracting attribute fail rates from convoluted systems in accordance with a second embodiment.

FIG. 7 is a flow diagram of extracting attribute fail rates from convoluted systems in accordance with a first embodiment. In a first step 700, initial analysis of a convoluted system may be initiated. This can include sampling production or test devices to generate test data to determine which devices are yielding and which are failing. Various design and process attributes may be captured with yield and failure information including sample size for each device for use in the analysis described below. For example, ATPG (Automatic Test Pattern Generation) may be utilized in an electronic design automation technology to find a test sequence that enables automatic test equipment to identify faulty circuit behavior. This information may be correlated with a database of circuit design and manufacturing process information stored for each device being tested. In a second step 702, the test data may be analyzed using test diagnostic tools to generate test results identifying fault locations. That is, patterns in the test data can be utilized to identify fault locations useful for further analysis as described below. In a third step 705, various unique combinations of attributes are identified for analysis. For example, device metal layers may be analyzed by critical area as described above with reference to FIG. 6. Then in step 710, each unique combination of attributes is assigned a unique identifier for utilization as described below.

Subsequently in step 715, the unique identifiers are then utilized to generate equations using yield information captured for each combination of attributes. This provides a set of equations to score each unique combination of attributes in terms of yield effect. These equations may be developed utilizing a yield matrix equation or other similar methods. It is important that the system of equations be overspecified with more equations (number of unique combinations of attributes) than variables (number of attribute types with failure rates to determine) that would require statistical analysis of the equations. An equal number of equations and variables may be utilized, which results in a single solution without the need for statistical analysis but in a real world manufacturing system, it is unlikely that this will be the case. If there are fewer equations than variables, then the attributes may be aggregated or otherwise parsed until there are more equations than variables. The form of aggregation and parsing may be developed based on what the user determines are combinations of attributes suitable for determining failure rates based on yields.

Then in step 720, the resulting yield based equations or the underlying yield information may be refined or otherwise filtered for improving subsequent statistical analysis. For example, certain outlier sample data may be due to improper sampling techniques and may be filtered to avoid skewing the underlying data. Another example is to utilize stepwise regression to refine the equations through forward selection, backward elimination or bidirectional elimination. Step 720 may be eliminated and the raw data and equations utilized in subsequent step 725.

In step 725, the yield equations may be weighted based on sample size $P_{Ni}$ of each net type. This allows for better estimation of the effects of sampling on the results. In step 730, the yield equations may be further modified to include at least one floating term such as $Z_{Ni}$ to take into account other factors which may cause loss of yield. There is a preliminary assumption made in the analysis flow, where a given set of equations for determining the fail rates on a variable, such via fail rates or critical area effect on defect density, should be created using the test failures that relate to the variable being analyzed, such as vias or net critical areas. Where not possible to completely exclude other causes, then statistics can be used to remove outlier results and to determine the most likely solution. The addition of factors for sample size and a floating term are well known statistical techniques.

In step 735, statistical analysis of the equations and yield information is utilized to determine failure rates (defect density) by attribute (critical area). This analysis helps identify problem attributes for correction or further analysis. Regression analysis may be utilized as well as other statistical techniques such as utilizing a classification tree. Many such techniques are known to those of ordinary skill for analyzing the equations and underlying sample data. Then in step 740, the user can determine whether to perform additional analysis of various combinations of attributes. If so, then processing returns to step 705, otherwise processing exits. The results of the above described analysis may be provided to a diagnostic tool, an EDA (electronic design automation) diagnostic tool at an RTL level (register-transfer level), or an EDA diagnostic tool at a physical level for the purpose of reducing defects.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for extracting process fail rates from convoluted systems. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of extracting attribute fail rates for manufactured devices comprising:
    testing manufactured devices having a set of attributes to provide a set of test results stored in memory;
    generating a yield model of the manufactured devices based on the set of test results and parsed by the set of attributes;
    and
    performing, by a processor, a statistical analysis of the generated yield model to extract fail rates of the selected subset of attributes.

2. The method of claim 1 wherein the set of attributes includes design attributes.

3. The method of claim 2 wherein the set of attributes further includes manufacturing process attributes.

4. The method of claim 1 wherein the yield model is generated from a subset of the set of attributes.

5. The method of claim 1 wherein the yield model includes a set of equations including known yield rates and unknown fail rates.

6. The method of claim 1 wherein the statistical analysis includes regression analysis.

7. The method of claim 6 wherein the statistical analysis includes stepwise regression.

8. The method of claim 6 wherein the statistical analysis includes at least one floating term for identifying fail rates not due to the set of attributes.

9. The method of claim 6 wherein the statistical analysis includes utilizing sample size to weight the extracted fail rates.

10. The method of claim 1 wherein testing includes electrically testing devices to generate test data and performing test pattern diagnostics on the test data to provide the test results.

11. The method of claim 1 wherein the extracted fail rates are provided to reduce defects to a group consisting of a diagnostic tool, an EDA (electronic design automation) diagnostic tool at the RTL level (register-transfer level), or an EDA diagnostic tool at a physical level.

12. The method of claim 3 wherein the yield model is generated from a subset of the set of attributes; wherein the yield model includes a set of equations including known yield rates and unknown fail rates; wherein the statistical analysis includes regression analysis; wherein the statistical analysis includes stepwise regression; wherein the statistical analysis includes at least one floating term for identifying fail rates not due to the set of attributes; wherein the statistical analysis includes utilizing sample size to weight the extracted fail rates; wherein testing includes electrically testing devices to generate test data and performing test pattern diagnostics on the test data to provide the test results and wherein the extracted fail rates are provided to reduce defects to a group consisting of a diagnostic tool, an EDA diagnostic tool at the RTL level, or an EDA diagnostic tool at a physical level.

13. A computer usable program product comprising a computer usable non-transient storage medium including computer usable code for use in extracting attribute fail rates for manufactured devices, the computer usable program product comprising code for performing the steps of:
    testing manufactured devices having a set of attributes to provide a set of test results stored in memory;
    generating a yield model of the manufactured devices based on the set of test results and parsed by the set of attributes;
    and
    performing, by a processor, a statistical analysis of the generated yield model to extract fail rates of the selected subset of attributes.

14. The computer usable program product of claim 13 wherein the set of attributes includes design attributes.

15. The computer usable program product of claim 14 wherein the set of attributes further includes manufacturing process attributes.

16. The computer usable program product of claim 13 wherein the yield model is generated from a subset of the set of attributes.

17. The computer usable program product of claim 13 wherein the yield model includes a set of equations including known yield rates and unknown fail rates.

18. The computer usable program product of claim 13 wherein the statistical analysis includes regression analysis.

19. The computer usable program product of claim 18 wherein the statistical analysis includes stepwise regression.

20. The computer usable program product of claim 18 wherein the statistical analysis includes at least one floating term for identifying fail rates not due to the set of attributes.

21. The computer usable program product of claim 18 wherein the statistical analysis includes utilizing sample size to weight the extracted fail rates.

22. The computer usable program product of claim 13 wherein testing includes electrically testing devices to generate test data and performing test pattern diagnostics on the test data to provide the test results.

23. The computer usable program product of claim 13 wherein the extracted fail rates are provided to reduce defects to a group consisting of a diagnostic tool, an EDA diagnostic tool at the RTL level, or an EDA diagnostic tool at a physical level.

24. A data processing system for extracting attribute fail rates for manufactured devices, the data processing system comprising:
    a processor; and
    a memory storing program instructions which when executed by the processor execute the steps of:
    testing manufactured devices having a set of attributes to provide a set of test results stored in the memory;
    generating a yield model of the manufactured devices based on the set of test results and parsed by the set of attributes;
    and performing, by a processor, a statistical analysis of the generated yield model to extract fail rates of the selected subset of attributes.

25. The data processing system of claim 24 wherein the set of attributes includes design attributes.

26. The data processing system of claim 25 wherein the set of attributes further includes manufacturing process attributes.

27. The data processing system of claim 24 wherein the yield model is generated from a subset of the set of attributes.

28. The data processing system of claim 24 wherein the yield model includes a set of equations including known yield rates and unknown fail rates.

29. The data processing system of claim 24 wherein the statistical analysis includes regression analysis.

30. The data processing system of claim 29 wherein the statistical analysis includes stepwise regression.

31. The data processing system of claim 29 wherein the statistical analysis includes at least one floating term for identifying fail rates not due to the set of attributes.

32. The data processing system of claim 29 wherein the statistical analysis includes utilizing sample size to weight the extracted fail rates.

33. The data processing system of claim 24 wherein testing includes electrically testing devices to generate test data and performing test pattern diagnostics on the test data to provide the test results.

34. The data processing system of claim 24 wherein the extracted fail rates are provided to reduce defects to a group consisting of a diagnostic tool, an EDA diagnostic tool at the RTL level, or an EDA diagnostic tool at a physical level.

* * * * *